(12) United States Patent
Quinn et al.

(10) Patent No.: US 8,855,454 B2
(45) Date of Patent: Oct. 7, 2014

(54) BUNDLED FIBER OPTIC CABLES

(75) Inventors: Justin Elisha Quinn, Newton, NC (US);
Thomas Andrew Rasmussen, III, Taylorsville, NC (US)

(73) Assignee: Draka Comteq, B.V., Amsterdam (NL)

( * ) Notice: Subject to any disclaimer, the term of this patent is extended or adjusted under 35 U.S.C. 154(b) by 662 days.

(21) Appl. No.: 13/099,663

(22) Filed: May 3, 2011

(65) Prior Publication Data

US 2011/0268398 A1    Nov. 3, 2011

Related U.S. Application Data

(60) Provisional application No. 61/330,696, filed on May 3, 2010.

(51) Int. Cl.
*G02B 6/44* (2006.01)
(52) U.S. Cl.
CPC ............ *G02B 6/4429* (2013.01); *G02B 6/4413* (2013.01)
USPC ........... 385/106; 385/104; 385/111; 385/113; 385/115

(58) Field of Classification Search
None
See application file for complete search history.

(56) References Cited

U.S. PATENT DOCUMENTS

| | | | |
|---|---|---|---|
| 4,838,643 A | 6/1989 | Hodges et al. | |
| 5,574,816 A | 11/1996 | Yang et al. | |
| 5,717,805 A | 2/1998 | Stulpin | |
| 5,761,362 A | 6/1998 | Yang et al. | |
| 5,911,023 A | 6/1999 | Risch et al. | |
| 5,982,968 A | 11/1999 | Stulpin | |
| 5,995,702 A | 11/1999 | Tjonneland | |
| 6,035,087 A | 3/2000 | Bonicel et al. | |
| 6,066,397 A | 5/2000 | Risch et al. | |
| 6,085,009 A | 7/2000 | Risch et al. | |
| 6,134,363 A | 10/2000 | Hinson et al. | |
| 6,175,677 B1 | 1/2001 | Yang et al. | |
| 6,181,857 B1 | 1/2001 | Emeterio et al. | |
| 6,210,802 B1 | 4/2001 | Risch et al. | |
| 6,215,931 B1 | 4/2001 | Risch et al. | |
| 6,314,224 B1 | 11/2001 | Stevens et al. | |
| 6,321,012 B1 | 11/2001 | Shen | |
| 6,321,014 B1 | 11/2001 | Overton et al. | |
| 6,334,016 B1 | 12/2001 | Greer, IV | |
| 6,381,390 B1 | 4/2002 | Hutton et al. | |
| 6,493,491 B1 | 12/2002 | Shen et al. | |
| 6,529,662 B1 | 3/2003 | Kobayashi et al. | |

(Continued)

FOREIGN PATENT DOCUMENTS

| EP | 1921478 A1 | 5/2008 |
|---|---|---|
| EP | 2287646 A2 | 2/2011 |

(Continued)

OTHER PUBLICATIONS

Corning, "The FTTH Prism" vol. 6, No. 4 (Sep. 2009) pp. 1-4.

(Continued)

*Primary Examiner* — Hemang Sanghavi
(74) *Attorney, Agent, or Firm* — Additon, Higgins & Pendleton, P.A.

(57) ABSTRACT

The present invention relates to a bundled cable suitable for installation in multiple dwelling unit (MDU) applications. The bundled cable includes two or more binders stranded around multiple stranded cable units. The bundled cable not only maintains its integrity on a reel and during installation, but also reduces installation time.

21 Claims, 1 Drawing Sheet

(56) References Cited

U.S. PATENT DOCUMENTS

| | | |
|---|---|---|
| 6,591,045 B2 * | 7/2003 | Kawabata ............... 385/100 |
| 6,603,908 B2 | 8/2003 | Dallas et al. |
| 6,618,538 B2 | 9/2003 | Nechitailo et al. |
| 6,658,184 B2 | 12/2003 | Bourget et al. |
| 6,749,446 B2 | 6/2004 | Nechitailo |
| 6,912,347 B2 | 6/2005 | Rossi et al. |
| 6,922,515 B2 | 7/2005 | Nechitailo et al. |
| 6,941,049 B2 | 9/2005 | Risch et al. |
| 7,045,010 B2 | 5/2006 | Sturman, Jr. |
| 7,162,128 B2 | 1/2007 | Lovie et al. |
| 7,322,122 B2 | 1/2008 | Overton et al. |
| 7,346,244 B2 | 3/2008 | Gowan et al. |
| 7,356,234 B2 | 4/2008 | de Montmorillon et al. |
| 7,483,613 B2 | 1/2009 | Bigot-Astruc et al. |
| 7,515,795 B2 | 4/2009 | Overton et al. |
| 7,526,177 B2 | 4/2009 | Matthijsse et al. |
| 7,555,186 B2 | 6/2009 | Flammer et al. |
| 7,567,739 B2 | 7/2009 | Overton et al. |
| 7,570,852 B2 | 8/2009 | Nothofer et al. |
| 7,587,111 B2 | 9/2009 | de Montmorillon et al. |
| 7,590,320 B2 | 9/2009 | Herbst |
| 7,599,589 B2 | 10/2009 | Overton et al. |
| 7,623,747 B2 | 11/2009 | de Montmorillon et al. |
| 7,639,915 B2 | 12/2009 | Parris et al. |
| 7,646,952 B2 | 1/2010 | Parris |
| 7,646,954 B2 | 1/2010 | Tatat |
| 7,702,204 B2 | 4/2010 | Gonnet et al. |
| 7,724,998 B2 | 5/2010 | Parris et al. |
| 7,817,891 B2 | 10/2010 | Lavenne et al. |
| 7,889,960 B2 | 2/2011 | de Montmorillon et al. |
| 8,565,565 B2 * | 10/2013 | Barrett et al. ............ 385/114 |
| 2008/0271919 A1 | 11/2008 | Elko |
| 2008/0292262 A1 | 11/2008 | Overton et al. |
| 2009/0175583 A1 | 7/2009 | Overton |
| 2009/0214167 A1 | 8/2009 | Lookadoo et al. |
| 2009/0252469 A1 | 10/2009 | Sillard et al. |
| 2009/0279833 A1 | 11/2009 | Overton et al. |
| 2009/0279835 A1 | 11/2009 | de Montmorillon et al. |
| 2009/0279836 A1 | 11/2009 | de Montmorillon et al. |
| 2009/0297107 A1 | 12/2009 | Tatat |
| 2010/0021170 A1 | 1/2010 | Lumineau et al. |
| 2010/0028020 A1 | 2/2010 | Gholami et al. |
| 2010/0067855 A1 | 3/2010 | Barker |
| 2010/0067857 A1 | 3/2010 | Lovie et al. |
| 2010/0092135 A1 | 4/2010 | Barker et al. |
| 2010/0092138 A1 | 4/2010 | Overton |
| 2010/0092139 A1 | 4/2010 | Overton |
| 2010/0092140 A1 | 4/2010 | Overton |
| 2010/0118388 A1 | 5/2010 | Pastouret et al. |
| 2010/0119202 A1 | 5/2010 | Overton |
| 2010/0135623 A1 | 6/2010 | Overton |
| 2010/0135624 A1 | 6/2010 | Overton et al. |
| 2010/0135625 A1 | 6/2010 | Overton |
| 2010/0135627 A1 | 6/2010 | Pastouret et al. |
| 2010/0142033 A1 | 6/2010 | Regnier et al. |
| 2010/0142969 A1 | 6/2010 | Gholami et al. |
| 2010/0150505 A1 | 6/2010 | Testu et al. |
| 2010/0154479 A1 | 6/2010 | Milicevic et al. |
| 2010/0166375 A1 | 7/2010 | Parris |
| 2010/0171945 A1 | 7/2010 | Gholami et al. |
| 2010/0183821 A1 | 7/2010 | Hartsuiker et al. |
| 2010/0189397 A1 | 7/2010 | Richard et al. |
| 2010/0189399 A1 | 7/2010 | Sillard et al. |
| 2010/0189400 A1 | 7/2010 | Sillard et al. |
| 2010/0202741 A1 | 8/2010 | Ryan et al. |
| 2010/0214649 A1 | 8/2010 | Burov et al. |
| 2010/0215328 A1 | 8/2010 | Tatat et al. |
| 2010/0254653 A1 | 10/2010 | Molin et al. |
| 2010/0310218 A1 | 12/2010 | Molin et al. |
| 2011/0026889 A1 | 2/2011 | Risch et al. |
| 2011/0044595 A1 | 2/2011 | Sillard et al. |
| 2011/0058781 A1 | 3/2011 | Molin et al. |
| 2011/0064367 A1 | 3/2011 | Molin et al. |
| 2011/0064731 A1 | 3/2011 | Leatherman et al. |
| 2011/0069724 A1 | 3/2011 | Richard et al. |
| 2011/0069932 A1 | 3/2011 | Overton et al. |
| 2011/0091171 A1 | 4/2011 | Tatat et al. |
| 2011/0116160 A1 | 5/2011 | Boivin et al. |
| 2011/0123161 A1 | 5/2011 | Molin et al. |
| 2011/0123162 A1 | 5/2011 | Molin et al. |
| 2011/0135262 A1 | 6/2011 | Molin et al. |
| 2011/0135263 A1 | 6/2011 | Molin et al. |
| 2011/0176782 A1 | 7/2011 | Parris |
| 2011/0188819 A1 | 8/2011 | Keller et al. |
| 2011/0188823 A1 | 8/2011 | Sillard et al. |
| 2011/0188826 A1 | 8/2011 | Sillard et al. |
| 2011/0211793 A1 | 9/2011 | Barrett et al. |
| 2011/0217012 A1 | 9/2011 | Bigot-Astruc et al. |
| 2011/0229101 A1 | 9/2011 | de Montmorillon et al. |
| 2011/0268398 A1 | 11/2011 | Quinn et al. |
| 2011/0268400 A1 | 11/2011 | Lovie et al. |

FOREIGN PATENT DOCUMENTS

| | | |
|---|---|---|
| EP | 2390700 A1 | 11/2011 |
| WO | 2004021367 A2 | 3/2004 |
| WO | 2009/062131 A1 | 5/2009 |
| WO | 2010/042816 A1 | 4/2010 |

OTHER PUBLICATIONS

Corning, "The FTTH Prism" vol. 6, No. 2 (Mar. 2009) pp. 1-7.
Bell, Verizon Product Concept, Bundled 2mm Indoor MDU Drop, Version 1.0, Sep. 25, 2008, pp. 1-6.
Draka, Product Specification for "ezINTERCONNECT Indoor" DS043, Dec. 8, 2008, pp. 1-3.
Draka, Product Specification for "ezINTERCONNECT Ruggedized Indoor" DS045, Sep. 5, 2008, pp. 1-2.
Draka, Product Specification for "ezINTERCONNECT Security Optical Cable" DS051, Apr. 12, 2009, pp. 1-2.
Draka, Product Specification for "ezINTERCONNECT MDU Drop" DS045, Mar. 31, 2009, pp. 1-2.
European extended Search Report in counterpart European Application No. 11164565 dated Oct. 28, 2011, pp. 1-7.

\* cited by examiner

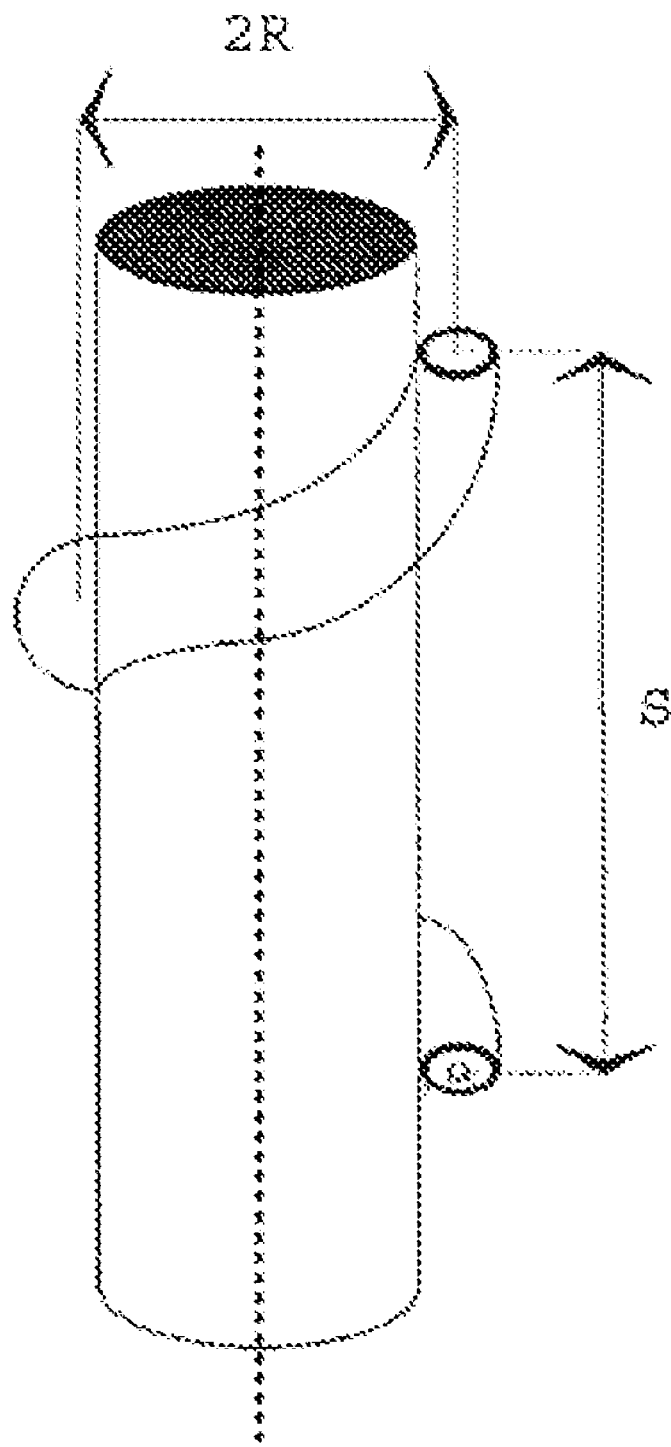

BUNDLED FIBER OPTIC CABLES

CROSS-REFERENCE TO PRIORITY APPLICATION

This application claims the benefit of U.S. Patent Application No. 61/330,696 for "Bundled Fiber Optic Cables" (filed May 3, 2010), which is hereby incorporated by reference in its entirety.

FIELD OF THE INVENTION

The invention relates to optical fiber telecommunications cables, particularly bundled cable units containing optical fibers that may be used in multiple dwelling unit (MDU) applications.

BACKGROUND

Optical fibers provide advantages over conventional communications lines. As such, fiber optic cables are becoming increasingly popular.

Fiber optic cables have traditionally been installed in Multi-Dwelling Units (MDU) (e.g., apartment complexes) by positioning the cables within pre-installed conduit systems near the ceiling (e.g., molding systems containing channels). For greater distances, multiple sections of conduit are placed in series. When multiple cables must be installed, each cable must be installed separately. In view of this repetitive and labor-intensive process, there is a need for a cable suitable for MDU applications that reduces the time and effort required to install multiple cables in a conduit system.

SUMMARY

Accordingly, in one aspect the present invention embraces a bundled cable suitable for use in multiple-dwelling-unit (MDU) applications. In this regard, the present bundled cable utilizes multiple cable units (e.g., 2-24 simplex or duplex interconnect cables) that can be concurrently installed (e.g., within an existing MDU conduit system). Typically, the cable units are stranded at cable-unit pitch $S_U$. The bundled cable further includes two binders (e.g., binder yarns) stranded around the cable units at binder-pitch $S_{Y1}$ and binder-pitch $S_{Y2}$. In some embodiments, the first binder-pitch $S_{Y1}$ is substantially equal to the second binder-pitch $S_{Y2}$. Typically, the ratio of the cable-unit pitch $S_U$ to the binder-pitch $S_{Y1}$ is between about 2.5 and 26.5 (e.g., less than 10, such as between about 2.6 and 3.2).

In some exemplary embodiments, the bundled cable includes two binders (e.g., binder tapes or broad yarns) that are contra-helically stranded around the cable units (i.e., helically stranded in opposite orientations, such as the S and Z directions).

In another aspect, the invention embraces a bundled cable that includes (i) cable units stranded at unit-stranding radius $R_U$ and unit-stranding angle $\alpha_U$ and (ii) two binder yarns stranded around the cable units. In this regard, the first binder yarn is stranded around the cable units at first binder-stranding radius $R_{Y1}$ and first binder-stranding angle $\alpha_{Y1}$, and the second binder yarn is stranded around the cable units at second binder-stranding radius $R_{Y2}$ and second binder-stranding angle $\alpha_{Y2}$.

In some embodiments, the following equation defines a pitch ratio X:

$$X = \frac{R_U}{R_{Y1}} \times \frac{\tan(\alpha_U)}{\tan(\alpha_{Y1})},$$

and the pitch ratio X is between about 2.5 and 26.5.

In another exemplary embodiment, the following relationship is true:

$$2.5 R_{Y1} \cdot \tan(\alpha_{Y1}) \le R_U \cdot \tan(\alpha_U) \le 26.5 R_{Y1} \cdot \tan(\alpha_{Y1}).$$

In yet another aspect, the invention embraces a bundled cable that includes binders helically stranded around cable units, wherein one or more of the binders includes two or more subyarns (e.g., a leading helical subyarn and a trailing helical subyarn). In this regard, the subyarns are phase-shift stranded by more than 0 degrees and less than about 90 degrees. Stated differently, the subyarns exhibit a translational phase shift of more than 0 degrees and less than about 90 degrees.

The foregoing illustrative summary, as well as other exemplary objectives and/or advantages of the invention, and the manner in which the same are accomplished, are further explained within the following detailed description and its accompanying drawings.

BRIEF DESCRIPTION OF THE DRAWING

FIG. 1 schematically depicts an exemplary stranding element that has been stranded around a central member.

DETAILED DESCRIPTION

In one aspect, the present invention embraces a bundled cable suitable for use in multiple dwelling unit (MDU) applications. In this regard, the present bundled cable utilizes multiple interconnect cables (e.g., simplex or duplex interconnect cables) that can be installed as one unit rather than separately installing a plurality of single interconnect cables. Typically, the interconnect cables (i.e., cable units) meet or exceed the requirements for interconnect cables defined by the GR-409 standard. The GR-409 standard is hereby incorporated by reference in its entirety. In some exemplary embodiments, the cable units comply with the ICEA-596 and/or ICEA-696 standards, each of which is hereby incorporated by reference in its entirety.

The cable units are typically constructed of an optical fiber (e.g., a buffered optical fiber) surrounded by a cable sheathing (e.g., a cable jacket). Cable sheathing may be formed from polymeric materials such as, for example, polyethylene, polypropylene, polyvinyl chloride (PVC), polyamides (e.g., nylon), polyester (e.g., PBT), fluorinated plastics (e.g., perfluorethylene propylene, polyvinyl fluoride, or polyvinylidene difluoride), and ethylene vinyl acetate. The sheath materials may also contain other additives, such as nucleating agents, flame-retardants, smoke-retardants, antioxidants, UV absorbers, and/or plasticizers. Typically, the cable units (and the resulting bundled cable) meet riser, plenum, tray & LSZH (Low-Smoke Zero-Halogen) fire safety requirements.

The cable sheathing may be a single jacket formed from a dielectric material (e.g., non-conducting polymers), with or without supplemental structural components that may be used to improve the protection (e.g., from rodents) and strength provided by the cable sheath. For example, one or more layers of metallic (e.g., steel) tape along with one or more dielectric jackets may form the cable sheathing. Metallic or fiberglass reinforcing rods (e.g., GRP) may also be incorporated into the sheath. In addition, aramid, fiberglass, or polyester yarns may be employed under the various sheath materials (e.g., between the cable sheath and the cable core), and/or ripcords may be positioned, for example, within the cable sheath.

Typically, the cable units have an outer diameter of between about 1.2 millimeters and 5.5 millimeters (e.g., 1.6-millimeter simplexes, 2.0-millimeter simplexes, or 2.9-millimeter simplexes), and the resulting bundled cable has an outer diameter of between about 4 millimeters and 9 millimeters (e.g., about 7.9 millimeters). That said, it is within the scope of the present invention to use cable units having a larger outer diameter (e.g., more than 5.5 millimeters). Likewise, it is within the scope of the present invention for the bundled cable to possess an outer diameter of about 25 millimeters or less.

In an exemplary embodiment, the cable unit includes one or more conventional standard single-mode fibers (SSMF). Suitable single-mode optical fibers that are compliant with the ITU-T G.652.D standard are commercially available, for instance, from Draka (Claremont, N.C.).

In a typical embodiment, the cable unit includes one or more bend-insensitive, single-mode optical fibers. Bend-insensitive optical fibers, which are less susceptible to attenuation (e.g., caused by microbending or macrobending), are commercially available from Draka (Claremont, N.C.) under the trade name BendBright®. BendBright® optical fibers are compliant with the ITU-T G.652.D standard. That said, it is within the scope of the present invention to employ a bend-insensitive glass fiber that meets the ITU-T G.657.A standard and/or the ITU-T G.657.B standard. The ITU-T G.652 and ITU-T G.657.A/B standards (November 2009) are hereby incorporated by reference in their entirety.

In this regard, particularly outstanding bend-insensitive single-mode glass fibers for use in the present invention are commercially available from Draka (Claremont, N.C.) under the trade name BendBright$^{XS}$®. BendBright$^{XS}$® optical fibers are not only compliant with both the ITU-T G.652.D and ITU-T G.657.A/B recommendations but also demonstrate significant improvement with respect to both macrobending and microbending.

As set forth in commonly assigned International Patent Application Publication No. WO 2009/062131 A1 for a Microbend Resistant Optical Fiber and U.S. Patent Application Publication No. US 2009/0175583 for a Microbend Resistant Optical Fiber, pairing a bend-insensitive glass fiber (e.g., Draka's single-mode glass fibers available under the trade name BendBright$^{XS}$®) and a primary coating having very low modulus achieves optical fibers having exceptionally low losses (e.g., reductions in microbend sensitivity of at least 10× as compared with a single-mode fiber employing a conventional coating system). Each of these patent publications is hereby incorporated by reference in its entirety.

In yet another embodiment, a cable unit includes a multimode optical fiber (e.g., conventional multimode fibers with a 50-micron core, such as OM2 multimode fibers, that comply with the ITU-T G.651.1 recommendations). The ITU-T G.651.1 standard (July 2007) is hereby incorporated by reference in its entirety. Exemplary multimode fibers that may be employed include MaxCap™ multimode fibers (OM2+, OM3, or OM4) commercially available from Draka (Claremont, N.C.).

Alternatively, the present cable unit may include bend-insensitive multimode fibers, such as MaxCap™-BB-OMx multimode fibers commercially available from Draka (Claremont, N.C.). Draka's MaxCap™-BB-OMx multimode fibers also comply with the ITU-T G.651.1 recommendations.

The optical fibers deployed in the present cable unit may employ the coatings disclosed in International Patent Application Publication No. WO 2009/062131 A1 and U.S. Patent Application Publication No. US 2009/0175583 with either single-mode optical fibers or multimode optical fibers.

Optical fibers typically have an outer diameter of between about 235 microns and 265 microns, although optical fibers having a smaller diameter are within the scope of the present invention.

By way of example, the component glass fiber may have an outer diameter of about 125 microns. With respect to the optical fiber's surrounding coating layers, the primary coating may have an outer diameter of between about 175 microns and 195 microns (i.e., a primary coating thickness of between about 25 microns and 35 microns) and the secondary coating may have an outer diameter of between about 235 microns and 265 microns (i.e., a secondary coating thickness of between about 20 microns and 45 microns). At least one of the coating layers—typically the secondary coating—may be colored and/or possess other markings to help identify individual fibers. Optionally, the optical fiber may include an outermost ink layer, which is typically between two and ten microns.

In one alternative embodiment, an optical fiber may possess a reduced diameter (e.g., an outermost diameter between about 150 microns and 230 microns). In this alternative optical fiber configuration, the thickness of the primary coating and/or secondary coating is reduced, while the diameter of the component glass fiber is maintained at about 125 microns.

By way of example, in such exemplary embodiments the primary coating layer may have an outer diameter of between about 135 microns and about 175 microns (e.g., about 160 microns), typically less than 165 microns (e.g., between about 135 microns and 150 microns) and usually more than 140 microns (e.g., between about 145 microns and 155 microns, such as about 150 microns). Moreover, in such exemplary embodiments, the secondary coating layer may have an outer diameter of between about 150 microns and about 230 microns (e.g., more than about 165 microns, such as 190-210 microns or so), typically between about 180 microns and 200 microns. In other words, the total diameter of the optical fiber is reduced to less than about 230 microns (e.g., between about 195 microns and 205 microns, and especially about 200 microns).

In another alternative embodiment, the diameter of the component glass fiber may be reduced to less than 125 microns (e.g., between about 60 microns and 120 microns), perhaps between about 70 microns and 115 microns (e.g., about 80-110 microns). This may be achieved, for instance, by reducing the thickness of one or more cladding layers. As compared with the prior alternative embodiment, (i) the total diameter of the optical fiber may be reduced (i.e., the thickness of the primary and secondary coatings are maintained in accordance with the prior alternative embodiment) or (ii) the respective thicknesses of the primary and/or secondary coatings may be increased relative to the prior alternative embodiment (e.g., such that the total diameter of the optical fiber might be maintained).

By way of illustration, with respect to the former, a component glass fiber having a diameter of between about 90 and 100 microns might be combined with a primary coating layer having an outer diameter of between about 110 microns and 150 microns (e.g., about 125 microns) and a secondary coating layer having an outer diameter of between about 130 microns and 190 microns (e.g., about 155 microns). With respect to the latter, a component glass fiber having a diameter of between about 90 and 100 microns might be combined with a primary coating layer having an outer diameter of between about 120 microns and 140 microns (e.g., about 130 microns) and a secondary coating layer having an outer diameter of between about 160 microns and 230 microns (e.g., about 195-200 microns).

Typically, each cable unit includes an optical fiber surrounded by a buffering layer (i.e., a buffer tube).

In an exemplary embodiment, the cable units include tight-buffered optical fibers. Those of ordinary skill in the art will appreciate that a tight-buffered optical fiber includes a buffer tube that tightly (i.e., closely) surrounds the optical fiber. The buffer tube is typically formed from a polymeric composition, optionally enhanced through the incorporation of a slip agent. In an exemplary embodiment, the slip agent possesses low solubility with the polymeric composition to facilitate the migration of the slip agent (e.g., an aliphatic amide slip agent) to the fiber-buffer interface. In this regard, the interface between the buffer tube and the optical fiber is lubricated and provides improved accessibility of the optical fiber.

In another exemplary embodiment, each cable unit includes a semi-tight buffered optical fiber. Those of ordinary skill in the art will appreciate that a semi-tight buffered optical fiber includes a buffering gap (e.g., an air gap) between the optical fiber and the buffer tube. The buffering gap typically has a thickness of less than about 50 microns (e.g., about 25 microns). More typically, the buffering gap has a thickness of less than about 15 microns (e.g., less than about 10 microns).

Typically, a plurality of cable units (e.g., 2-24, such as 6-12 cable units) are employed in the bundled cable.

In this regard, a plurality of cable units may be stranded around themselves without a central member. This stranding can be accomplished in one direction—helically—known as "S" or "Z" stranding, or Reverse Oscillated Lay stranding, known as "S-Z" stranding. As used herein, references to "helical" or "helically" do not imply a particular orientation (e.g., S direction or Z direction). Stranding reduces optical fiber strain when cable strain occurs during installation and use. Those of ordinary skill in the art will understand the benefit of minimizing fiber strain for both tensile cable strain and longitudinal compressive cable strain during installation or operating conditions.

In some embodiments, multiple cable units are stranded around one or more other cable units. For example, a 12-unit bundled cable may contain nine cable units stranded around three cable units. In another exemplary embodiment, five cable units are stranded around one cable unit.

Furthermore, when multiple cable units form the central portion of the stranding (e.g., the three cable units in the previous 12-unit example), the central cable units may be stranded around themselves. Alternatively, the central cable units may simply extend parallel to the longitudinal axis of the cable.

Typically, the bundled cable of the present invention does not include a central strength member. That said, it is within the scope of the present invention to strand the cable units around a central strength member or another form of filler material.

Those of ordinary skill in the art will recognize that helically stranded elements are stranded in one direction with a constant angle to the longitudinal axis of the cable. Helical stranding may be performed in the "S" direction, so that the stranding elements describe an "S" along the cable axis. Helical stranding may also be performed in the "Z" direction, so that the stranding elements describe a "Z" along the cable axis. Stated differently, S helical stranding generates a left-handed helix, while Z helical stranding generates a right-handed helix.

In reverse lay stranding (i.e., SZ stranding), the direction of stranding reverses after a predetermined number of revolutions. In other words, the stranding element is initially stranded helically in either the S or Z direction, and then stranded helically in the opposite direction. The stranding and reversing process is repeated along the length of the stranding elements. At the reverse points of an SZ stranding, the stranding elements may lie substantially parallel to the stranding axis.

Those of ordinary skill in the art will recognize that helically stranded elements (e.g., cable units) effectively define a cylindrical helix that extends along the cable axis. In this regard, the helical stranding can be described by a "pitch" or "lay length" S, a "stranding radius" R, and/or a "stranding angle" $\alpha$.

FIG. 1 schematically depicts an exemplary stranding element that has been stranded around a central member (e.g., a central strength member or filler material). The stranding element's pitch S and stranding diameter 2R (i.e., double the stranding radius R) are shown.

The pitch S refers to a stranded element's length after a full turn of 360 degrees. Stated differently, the pitch S is the longitudinal distance along the cable required for one complete helical wrap. It should be noted that the variable S used to designate pitch should not be confused with S direction stranding.

The stranding radius R refers to the distance between the axis of the cable (i.e., the longitudinal cable axis) and the middle of the stranding element.

Finally, the stranding angle $\alpha$ refers to the angle between the stranding element and the cable cross-section. The stranding angle $\alpha$ can be calculated using the following equation:

$$\alpha = \arctan\left(\frac{S}{2\pi R}\right).$$

Those having ordinary skill in the art will appreciate that various stranding parameters, including "pitch" S, "stranding radius" R, and "stranding angle" $\alpha$ are targeted during the manufacturing process. Actual values for the stranding parameters may deviate from cable-design targets.

As previously discussed, the bundled cable of the present invention typically includes a plurality of stranded cable units. Each cable unit typically includes at least one optical fiber (e.g., a buffered optical fiber).

In this regard and as will be appreciated by those having ordinary skill in the art, the particular pitch S, the stranding radius R, and the stranding angle $\alpha$ should be selected to ensure that the helix formed by the stranded cable unit does not have a radius of curvature (i.e., bending radius) that is less than the minimum permissible bending radius for the optical fiber within the cable unit. If the bending radius of the stranded cable unit is too small, unwanted attenuation may be induced in the optical fiber. As previously discussed, bend-insensitive fibers such as Draka's BendBright® and BendBright$^{XS}$® optical fibers are less susceptible to such attenuation and are thus particularly well-suited for use in the bundled cable of the present invention.

The bending radius q of the stranded cable unit may be calculated using the following equation:

$$q = R * \left\{1 + \left(\frac{S}{2\pi R}\right)^2\right\}.$$

Using this equation and the minimum bending radius of the optical fibers within the cable units, a cable unit-pitch $S_U$, unit stranding angle $\alpha_U$, and unit-stranding radius $R_U$ for the cable units can be selected. In other words, the cable unit-pitch $S_U$, unit stranding angle $\alpha_U$, and unit-stranding radius $R_U$ for the cable units can be selected to assure that the bending radius q is not less than the minimum permissible bending radius of the optical fiber within the cable units.

In some embodiments, the cable-unit pitch $S_U$ is between about two and twelve inches (e.g., about ten inches), typically between about three and eight inches (e.g., between about five and six inches).

In some embodiments, the unit stranding angle $\alpha_U$ is typically between about 30 and 65 degrees (e.g., about 45 degrees).

In some embodiments, the unit-stranding radius $R_U$ is typically between about 0.1 inch and 0.6 inch (e.g., between about 0.2 inch and 0.5 inch).

The cable units of the present bundled cable are stranded (e.g., SZ, S, or Z stranded) and then bundled together using binders (e.g., binder yarns or binder tapes). Typically, two or more binders (e.g., four binders) are stranded around the cable units. The binders employed in the bundled cable of the present invention are typically polymeric yarns, such as polyester or aramid yarns, or polymeric tapes or ribbons, such as polyester tape.

Each binder typically has a total weight per unit length of between about 440 denier and 5280 denier (e.g., about 2600 denier).

Those having ordinary skill in the art will recognize that when binders are stranded (i) at the same pitch and (ii) out of phase by about 180 degrees, the binders are effectively separated by a translational offset (e.g., a translational phase shift) along the longitudinal axis of the cable that is substantially equal to about half of the binders' pitch.

In an exemplary embodiment including two binders, the binders are contra-helically stranded. In this regard, the two binders are stranded in opposite directions (e.g., as a left-handed helix and a right-handed helix, respectively). For example, a first binder is stranded in the S direction, and a second binder is stranded in the Z direction.

Typically, the binders are not SZ stranded around the cable units. That said, it is within the scope of the present invention to SZ strand one or more binders around the cable units.

In yet another exemplary embodiment, a first binder yarn is stranded at a pitch (i.e., binder-pitch $S_{Y1}$) around the cable units, and a second binder yarn is stranded at a pitch (i.e., binder-pitch $S_{Y2}$) around the cable units. By way of example, binder-pitch $S_{Y1}$ and binder-pitch $S_{Y2}$ are typically between about 0.5 inch and 3.0 inches (e.g., between about 0.75 inch and 1.5 inches). Typically, binder-pitch $S_{Y1}$ is substantially equal to said binder-pitch $S_{Y2}$. That said, it is within the scope of the present invention to strand binders around the cable units at different pitches.

In another exemplary embodiment, a first binder yarn is stranded at first binder-stranding radius $R_{Y1}$ and first binder-stranding angle $\alpha_{Y1}$ around the cable units, and a second binder yarn is stranded at second binder-stranding radius $R_{Y2}$ and second binder-stranding angle $\alpha_{Y2}$ around the cable units. By way of example, first binder-stranding radius $R_{Y1}$ and second binder-stranding radius $R_{Y2}$ are typically between about 0.1 inch and 0.65 inch (e.g., between about 0.2 inch and 0.5 inch). By way of further example, first binder-stranding angle $\alpha_{Y1}$ and second binder-stranding angle $\alpha_{Y2}$ are typically between about 10 and 50 degrees (e.g., 15-30 degrees, such as 16.6 degrees). Typically, the first binder-stranding radius $R_{Y1}$ is substantially equal to the second binder-stranding radius $R_{Y2}$, and the first binder-stranding angle $\alpha_{Y1}$ is substantially equal to the second binder-stranding angle $\alpha_{Y2}$.

In an alternative exemplary embodiment including two binders, the binders are helically stranded around the cable units in the same direction. In this regard, both binders are stranded in the S or Z direction. Typically, the binders of this embodiment are stranded in the opposite direction of the cable units. For example, if the cable units are stranded in the S direction, the binders should be stranded in the Z direction. Additionally, when both binders are helically stranded in the same direction, they are typically stranded out of phase by about 180 degrees.

In some embodiments, the binders (e.g., binder yarns) are finished yarns. In this regard, the fibers (i.e., threads) of finished yarns cannot be easily separated (e.g., splayed). Typically, finished yarns are coated, and perhaps intermingled, which tends to prevent separation of the fibers.

Alternatively, the binders may include semi-finished yarns. As compared with finished yarns, the fibers of semi-finished yarns may be readily separated (e.g., splayed). Semi-finished yarns typically have less coating (or a different kind of coating) than a finished yarn (e.g., a semi-finished yarn might have no coating at all, such as an uncoated polyester binder). Moreover, as compared with finished yarns, semi-finished yarns may be less intermingled.

In exemplary embodiments of the present invention, semi-finished binder yarns are stranded around the optical cable units. The semi-finished binder yarns may be splayed across the external surface of the cable unit. In this regard, the semi-finished binder yarn supports the cable unit across a broader surface area, which reduces the pressure on the cable jacket at the point of contact. This, in turn, reduces the pressure on the optical fiber within the cable unit.

Those of ordinary skill in the art will recognize that preventing external forces from affecting an optical fiber reduces the likelihood that microbending will cause attenuation of transmitted optical signals. In this regard, the use of semi-finished binder yarns provides a technical advantage.

In embodiments utilizing splayed binder yarns, binder measurements (e.g., pitch $S_Y$, stranding radius $R_Y$, stranding angle $\alpha_Y$, and/or translational phase shift) are referenced with respect to the center of the splayed fibers.

In some embodiments, a single binder may include two subyarns (e.g., a leading subyarn and a trailing subyarn). In this regard, the two subyarns of a single binder are stranded out of phase with each other (i.e., phase-shift stranded). Stated differently, one subyarn (e.g., the leading subyarn) exhibits a translational phase shift from the other subyarn (e.g., the trailing subyarn). A stranded binder including two subyarns typically forms a structure similar to a "double helix," wherein the subyarns represent each helix. Those of ordinary skill in the art will recognize that the translational phase shift between the subyarns represents a translational offset along the longitudinal axis of the cable that may be expressed in degrees (e.g., degrees of helical rotation).

Typically, the subyarns are phase-shift stranded by more than 0 degrees and less than about 90 degrees (e.g., less than 45 degrees, such as between 15 and 45 degrees). In some embodiments, the subyarns are phase-shift stranded by more than 5 degrees and less than about 60 degrees (e.g., between about 10 and 30 degrees). In other embodiments, the subyarns are phase-shift stranded by less than about 15 degrees (e.g., between about 5 and 15 degrees), such as more than 0 degrees and less than about 10 degrees.

Those having ordinary skill in the art will appreciate that "translational phase shift" is targeted during the manufacturing process. The actual translational offset between subyarns may deviate from cable-design targets.

A binder including subyarns supports the cable unit across a broader surface area, thereby reducing the pressure on the cable jacket at the point of contact. This, in turn, may reduce the pressure on the optical fiber within the cable unit. As previously discussed, preventing external forces from affecting an optical fiber reduces the likelihood that microbending will cause attenuation of transmitted optical signals. In this regard, the use of binders including subyarns provides a technical advantage.

Typically, the bundled cables include binders having two subyarns, such as two 1300-denier subyarns. That said, it is within the scope of the present invention to use binders including more than two subyarns (e.g., three or more subyarns).

With respect to embodiments utilizing binder subyarns, binder measurements (e.g., pitch $S_Y$, stranding radius $R_Y$, stranding angle $\alpha_Y$, and/or translational phase shift) should be taken (i.e., referenced) at a point that represents the average position of the subyarns on the longitudinal axis of the cable. For example, when a binder includes two subyarns, the binder's pitch should be measured from the point that is halfway between the subyarns along the longitudinal axis of the cable.

Typically, the binders are stranded at binder-pitch $S_Y$ (i.e., the pitch of the binders) of more than about 0.5 inch (e.g., about 1.5 inches). Stranding the binders at a lower binder-pitch $S_Y$ may make the bundled cable too rigid and may inhibit a technician's ability to access the individual cable units during field installation. Additionally, stranding the binders at a lower binder-pitch $S_Y$ may inhibit the bundled cable's ability to make multiple 90-degree bends, which may be required in certain cable deployments.

Stranding the binders at an excessively high binder-pitch, however, will not sufficiently bind the cable units. For example, the cable units may become unstranded during installation or handling. Furthermore, a bundled cable with an excessively high binder-pitch may not maintain its integrity on a cable reel. In this regard, the stranding characteristics and size of the cable units should be considered when selecting the stranding characteristics of the binders.

Typically, the binder-pitch $S_Y$ (i.e., the pitch of the binder) is selected such that the ratio of the cable-unit pitch $S_U$ (i.e., the pitch of the cable units) to the binder-pitch $S_{Y1}$ is between about 2.5 and 26.5 (e.g., less than about 10, such as about 6.5). In some embodiments, the ratio of the cable-unit pitch $S_U$ to the binder-pitch $S_Y$ (i.e., $S_U:S_Y$) is between about 3 and 15 (e.g., between about 5 and 8, such as about 6 or 7). In other embodiments, the ratio of the cable-unit pitch $S_U$ to the binder-pitch $S_Y$ (i.e., $S_U:S_Y$) is between about 2.6 and 3.2.

In another exemplary embodiment of the bundled cable, the binder-yarn-stranding radius $R_Y$ and binder-yarn-stranding angle $\alpha_Y$ are selected based upon the unit-stranding radius $R_U$ and unit-stranding angle $\alpha_U$. In this regard, the pitch ratio X is between about 2.5 and 26.5 (e.g., between about 5 and 8, such as about 6.5), wherein the pitch ratio X is defined by the following equation:

$$X = \frac{R_U}{R_{Y1}} \times \frac{\tan(\alpha_U)}{\tan(\alpha_{Y1})}.$$

In some embodiments, the pitch ratio X is between about 2.6 and 3.2.

In yet another exemplary embodiment of the bundled cable, the binder-yarn-stranding radius $R_Y$ and binder-yarn-stranding angle $\alpha_Y$ are selected such that the following relationship is true:

$$2.5 R_{Y1} \cdot \tan(\alpha_{Y1}) \leq R_U \cdot \tan(\alpha_U) \leq 26.5 R_{Y1} \cdot \tan(\alpha_{Y1}).$$

In some embodiments, the following relationship is true:

$$5 R_{Y1} \cdot \tan(\alpha_{Y1}) \leq R_U \cdot \tan(\alpha_U) \leq 8 R_{Y1} \cdot \tan(\alpha_{Y1}).$$

In some embodiments, the following relationship is true:

$$6.5 R_{Y1} \cdot \tan(\alpha_{Y1}) \approx R_U \cdot \tan(\alpha_U).$$

In other embodiments, the following relationship is true:

$$2.6 R_{Y1} \cdot \tan(\alpha_{Y1}) \leq R_U \cdot \tan(\alpha_U) \leq 3.2 R_{Y1} \cdot \tan(\alpha_{Y1}).$$

With respect to the foregoing embodiments and as noted, the second binder-stranding radius $R_{Y2}$ typically is substantially equal to the first binder-stranding radius $R_{Y1}$, and the second binder-stranding angle $\alpha_{Y2}$ typically is substantially equal to the first binder-stranding angle $\alpha_{Y1}$.

In one exemplary embodiment, the bundled cable includes twelve cable units each having an outer diameter of about 1.6 millimeters. Each cable unit includes a single 900-micron Draka BendBright® Elite tight-buffered optical fiber. The cable units are distinctly colored using the twelve colors of the standard fiber optic color code. Nine of the cable units are helically stranded (e.g., S, Z, or SZ stranded) over the other three cable units at a unit-pitch $S_U$ of ten inches. Two semi-finished binder yarns of 2600-denier polyester are contra-helically stranded around the cable units at binder-pitches $S_{Y1}$ and $S_{Y2}$ of about 1.5 inches. Furthermore, the two binder yarns are made of two subyarns (i.e., each of 1300-denier polyester). The two subyarns are phase-shift stranded such that the leading subyarn exhibits a translational phase shift from the trailing subyarn of more than zero degrees and less than about 10 degrees (e.g., about 5 degrees).

In another exemplary embodiment, the bundled cable includes six cable units SZ stranded around one central cable unit at a unit-pitch $S_U$ of about 5.75 inches. Two semi-finished binder yarns of 2600-denier polyester are contra-helically stranded around the cable units at binder-pitches $S_{Y1}$ and $S_{Y2}$ of about 1.8 inches. The two binder yarns are made of two subyarns that are phase-shift stranded such that the leading subyarn exhibits a translational phase shift from the trailing subyarn of more than zero degrees and less than about 5 degrees.

Typically, the bundled cable is installed in the channel of a molding system or other pre-installed conduit system in an MDU structure (e.g., an apartment building). Once installed, a technician can remove a section of binder to expose the cable units. The technician may then access the appropriate unit, cut the cable unit, remove the cut cable unit from the bundle, and route the cable unit through an access hole at each individual dwelling unit. The technician can then place the exposed cable units back into the channel of the molding system and conceal the bundled cable. Typically, the bundled cable is connectorized.

This application further incorporates by reference product specifications for the following Draka products that may be suitable for use as cable units: ezINTERCONNECT™ Indoor cables, ezINTERCONNECT™ Ruggedized Indoor cables, ezINTERCONNECT™ Security Optical Cables, ezINTERCONNECT™ MDU Drop cables, and ezINTERCONNECT™ Micro Fiber Cables. This technical information is provided as Appendices 1-5, respectively.

To supplement the present disclosure, this application incorporates entirely by reference the following commonly assigned patents, patent application publications, and patent applications: U.S. Pat. No. 4,838,643 for a Single Mode Bend Insensitive Fiber for Use in Fiber Optic Guidance Applications (Hodges et al.); U.S. Pat. No. 7,623,747 for a Single Mode Optical Fiber (de Montmorillon et al.); U.S. Pat. No.

7,587,111 for a Single-Mode Optical Fiber (de Montmorillon et al.); U.S. Pat. No. 7,356,234 for a Chromatic Dispersion Compensating Fiber (de Montmorillon et al.); U.S. Pat. No. 7,483,613 for a Chromatic Dispersion Compensating Fiber (Bigot-Astruc et al.); U.S. Pat. No. 7,526,177 for a Fluorine-Doped Optical Fiber (Matthijsse et al.); U.S. Pat. No. 7,555,186 for an Optical Fiber (Flammer et al.); U.S. Patent Application Publication No. US2009/0252469 A1 for a Dispersion-Shifted Optical Fiber (Sillard et al.); U.S. Patent Application Publication No. US2011/0044595 A1 for a Transmission Optical Fiber Having Large Effective Area (Sillard et al.); International Patent Application Publication No. WO 2009/062131 A1 for a Microbend-Resistant Optical Fiber, (Overton); U.S. Patent Application Publication No. US2009/0175583 A1 for a Microbend-Resistant Optical Fiber, (Overton); U.S. Patent Application Publication No. US2009/0279835 A1 for a Single-Mode Optical Fiber Having Reduced Bending Losses, filed May 6, 2009, (de Montmorillon et al.); U.S. Pat. No. 7,889,960 for a Bend-Insensitive Single-Mode Optical Fiber, (de Montmorillon et al.); U.S. Patent Application Publication No. US2010/0021170 A1 for a Wavelength Multiplexed Optical System with Multimode Optical Fibers, filed Jun. 23, 2009, (Lumineau et al.); U.S. Patent Application Publication No. US2010/0028020 A1 for a Multimode Optical Fibers, filed Jul. 7, 2009, (Gholami et al.); U.S. Patent Application Publication No. US2010/0119202 A1 for a Reduced-Diameter Optical Fiber, filed Nov. 6, 2009, (Overton); U.S. Patent Application Publication No. US2010/0142969 A1 for a Multimode Optical System, filed Nov. 6, 2009, (Gholami et al.); U.S. Patent Application Publication No. US2010/0118388 A1 for an Amplifying Optical Fiber and Method of Manufacturing, filed Nov. 12, 2009, (Pastouret et al.); U.S. Patent Application Publication No. US2010/0135627 A1 for an Amplifying Optical Fiber and Production Method, filed Dec. 2, 2009, (Pastouret et al.); U.S. Patent Application Publication No. US2010/0142033 for an Ionizing Radiation-Resistant Optical Fiber Amplifier, filed Dec. 8, 2009, (Regnier et al.); U.S. Patent Application Publication No. US2010/0150505 A1 for a Buffered Optical Fiber, filed Dec. 11, 2009, (Testu et al.); U.S. Patent Application Publication No. US2010/0171945 for a Method of Classifying a Graded-Index Multimode Optical Fiber, filed Jan. 7, 2010, (Gholami et al.); U.S. Patent Application Publication No. US2010/0189397 A1 for a Single-Mode Optical Fiber, filed Jan. 22, 2010, (Richard et al.); U.S. Patent Application Publication No. US2010/0189399 A1 for a Single-Mode Optical Fiber Having an Enlarged Effective Area, filed Jan. 27, 2010, (Sillard et al.); U.S. Patent Application Publication No. US2010/0189400 A1 for a Single-Mode Optical Fiber, filed Jan. 27, 2010, (Sillard et al.); U.S. Patent Application Publication No. US2010/0214649 A1 for an Optical Fiber Amplifier Having Nanostructures, filed Feb. 19, 2010, (Burow et al.); U.S. Patent Application Publication No. US2010/0254653 A1 for a Multimode Fiber, filed Apr. 22, 2010, (Molin et al.); U.S. Patent Application Publication No. US2010/0310218 A1 for a Large Bandwidth Multimode Optical Fiber Having a Reduced Cladding Effect, filed Jun. 4, 2010, (Molin et al.); U.S. Patent Application Publication No. US2011/0058781 A1 for a Multimode Optical Fiber Having Improved Bending Losses, filed Sep. 9, 2010, (Molin et al.); U.S. Patent Application Publication No. US2011/0064367 A1 for a Multimode Optical Fiber, filed Sep. 17, 2010, (Molin et al.); U.S. Patent Application Publication No. US2011/0069724 A1 for an Optical Fiber for Sum-Frequency Generation, filed Sep. 22, 2010, (Richard et al.); U.S. patent application Ser. No. 12/944,422 for a Rare-Earth-Doped Optical Fiber Having Small Numerical Aperture, filed Nov. 11, 2010, (Boivin et al.); U.S. patent application Ser. No. 12/953,948 for a High-Bandwidth, Multimode Optical Fiber with Reduced Cladding Effect, filed Nov. 24, 2010, (Molin et al.); U.S. patent application Ser. No. 12/954,036 for a High-Bandwidth, Dual-Trench-Assisted Multimode Optical Fiber, filed Nov. 24, 2010, (Molin et al.); U.S. patent application Ser. No. 12/959,688 for a Multimode Optical Fiber with Low Bending Losses and Reduced Cladding Effect, filed Dec. 3, 2010, (Molin et al.); U.S. patent application Ser. No. 12/959,866 for a High-Bandwidth Multimode Optical Fiber Having Reduced Bending Losses, filed Dec. 3, 2010, (Molin et al.); U.S. patent application Ser. No. 13/017,089 for a Non-Zero Dispersion Shifted Optical Fiber Having a Large Effective Area, filed Jan. 31, 2011, (Sillard et al.); U.S. patent application Ser. No. 13/017,092 for a Non-Zero Dispersion Shifted Optical Fiber Having a Short Cutoff Wavelength, filed Jan. 31, 2011, (Sillard et al.); U.S. patent application Ser. No. 13/037,943 for a Broad-Bandwidth Multimode Optical Fiber Having Reduced Bending Losses, filed Mar. 1, 2011, (Bigot-Astruc et al.); and U.S. patent application Ser. No. 13/048,028 for a Single-Mode Optical Fiber, filed Mar. 15, 2011, (de Montmorillon et al.).

To supplement the present disclosure, this application further incorporates entirely by reference the following commonly assigned patents, patent application publications, and patent applications: U.S. Pat. No. 5,574,816 for Polypropylene-Polyethylene Copolymer Buffer Tubes for Optical Fiber Cables and Method for Making the Same; U.S. Pat. No. 5,717,805 for Stress Concentrations in an Optical Fiber Ribbon to Facilitate Separation of Ribbon Matrix Material; U.S. Pat. No. 5,761,362 for Polypropylene-Polyethylene Copolymer Buffer Tubes for Optical Fiber Cables and Method for Making the Same; U.S. Pat. No. 5,911,023 for Polyolefin Materials Suitable for Optical Fiber Cable Components; U.S. Pat. No. 5,982,968 for Stress Concentrations in an Optical Fiber Ribbon to Facilitate Separation of Ribbon Matrix Material; U.S. Pat. No. 6,035,087 for an Optical Unit for Fiber Optic Cables; U.S. Pat. No. 6,066,397 for Polypropylene Filler Rods for Optical Fiber Communications Cables; U.S. Pat. No. 6,175,677 for an Optical Fiber Multi-Ribbon and Method for Making the Same; U.S. Pat. No. 6,085,009 for Water Blocking Gels Compatible with Polyolefin Optical Fiber Cable Buffer Tubes and Cables Made Therewith; U.S. Pat. No. 6,215,931 for Flexible Thermoplastic Polyolefin Elastomers for Buffering Transmission Elements in a Telecommunications Cable; U.S. Pat. No. 6,134,363 for a Method for Accessing Optical Fibers in the Midspan Region of an Optical Fiber Cable; U.S. Pat. No. 6,381,390 for a Color-Coded Optical Fiber Ribbon and Die for Making the Same; U.S. Pat. No. 6,181,857 for a Method for Accessing Optical Fibers Contained in a Sheath; U.S. Pat. No. 6,314,224 for a Thick-Walled Cable Jacket with Non-Circular Cavity Cross Section; U.S. Pat. No. 6,334,016 for an Optical Fiber Ribbon Matrix Material Having Optimal Handling Characteristics; U.S. Pat. No. 6,321,012 for an Optical Fiber Having Water Swellable Material for Identifying Grouping of Fiber Groups; U.S. Pat. No. 6,321,014 for a Method for Manufacturing Optical Fiber Ribbon; U.S. Pat. No. 6,210,802 for Polypropylene Filler Rods for Optical Fiber Communications Cables; U.S. Pat. No. 6,493,491 for an Optical Drop Cable for Aerial Installation; U.S. Pat. No. 7,346,244 for a Coated Central Strength Member for Fiber Optic Cables with Reduced Shrinkage; U.S. Pat. No. 6,658,184 for a Protective Skin for Optical Fibers; U.S. Pat. No. 6,603,908 for a Buffer Tube that Results in Easy Access to and Low Attenuation of Fibers Disposed Within Buffer Tube; U.S. Pat. No. 7,045,010 for an Applicator for High-Speed Gel Buffering of Flextube Optical Fiber Bundles; U.S. Pat. No. 6,749,446 for an Optical Fiber Cable with Cushion Members Protecting Optical Fiber Ribbon Stack; U.S. Pat. No. 6,922,515 for a Method and Apparatus to Reduce Variation of Excess Fiber Length in Buffer Tubes of Fiber Optic Cables; U.S. Pat. No. 6,618,538 for a Method and Apparatus to Reduce Variation of Excess Fiber Length in Buffer Tubes of Fiber Optic Cables; U.S. Pat. No. 7,322,122 for a Method and Apparatus for Curing a Fiber Having at Least Two Fiber Coating Curing Stages; U.S. Pat. No. 6,912,347 for an Optimized Fiber Optic Cable Suitable for Microduct Blown Installation; U.S. Pat. No. 6,941,049 for a Fiber Optic Cable Having No Rigid Strength Members and a Reduced Coefficient of Thermal Expansion; U.S. Pat. No. 7,162,128 for Use of Buffer Tube Coupling Coil to Prevent Fiber Retraction; U.S. Pat. No. 7,515,795 for a Water-Swellable Tape, Adhesive-Backed for Coupling When Used Inside a Buffer Tube (Overton et al.); U.S. Patent Application Publication No. 2008/0292262 for a Grease-Free Buffer Optical Fiber Buffer Tube Construction Utilizing a Water-Swellable, Texturized Yarn (Overton et al.); European Patent Application Publication No. 1,921,478 A1, for a Telecommunication Optical Fiber Cable (Tatat et al.); U.S. Pat. No. 7,702,204 for a Method for Manufacturing an Optical Fiber Preform (Gonnet et al.); U.S. Pat. No. 7,570,852 for an Optical Fiber Cable Suited for Blown Installation or Pushing Installation in Microducts of Small Diameter (Nothofer et al.); U.S. Pat. No. 7,646,954 for an Optical Fiber Telecommunications Cable (Tatat); U.S. Pat. No. 7,599,589 for a Gel-Free Buffer Tube with Adhesively Coupled Optical Element (Overton et al.); U.S. Pat. No. 7,567,739 for a Fiber Optic Cable Having a Water-Swellable Element (Overton); U.S. Pat. No. 7,817,891 for a Method for Accessing Optical Fibers within a Telecommunication Cable (Lavenne et al.); U.S. Pat. No. 7,639,915 for an Optical Fiber Cable Having a Deformable Coupling Element (Parris et al.); U.S. Pat. No. 7,646,952 for an Optical Fiber Cable Having Raised Coupling Supports (Parris); U.S. Pat. No. 7,724,998 for a Coupling Composition for Optical Fiber Cables (Parris et al.); U.S. Patent Application Publication No. US2009/0214167 A1 for a Buffer Tube with Hollow Channels, (Lookadoo et al.); U.S. Patent Application Publication No. US2009/0297107 A1 for an Optical Fiber Telecommunication Cable, filed May 15, 2009, (Tatat); U.S. Patent Application Publication No. US2009/0279833 A1 for a Buffer Tube with Adhesively Coupled Optical Fibers and/or Water-Swellable Element, filed Jul. 21, 2009, (Overton et al.); U.S. Patent Application Publication No. US2010/0092135 A1 for an Optical Fiber Cable Assembly, filed Sep. 10, 2009, (Barker et al.); U.S. Patent Application Publication No. US2010/0067857 A1 for a High-Fiber-Density Optical Fiber Cable, filed Sep. 10, 2009, (Louie et al.); U.S. Patent Application Publication No. US2010/0067855 A1 for a Buffer Tubes for Mid-Span Storage, filed Sep. 11, 2009, (Barker); U.S. Patent Application Publication No. US2010/0135623 A1 for Single-Fiber Drop Cables for MDU Deployments, filed Nov. 9, 2009, (Overton); U.S. Patent Application Publication No. US2010/0092140 A1 for an Optical-Fiber Loose Tube Cables, filed Nov. 9, 2009, (Overton); U.S. Patent Application Publication No. US2010/0135624 A1 for a Reduced-Size Flat Drop Cable, filed Nov. 9, 2009, (Overton et al.); U.S. Patent Application Publication No. US2010/0092138 A1 for ADSS Cables with High-Performance Optical Fiber, filed Nov. 9, 2009, (Overton); U.S. Patent Application Publication No. US2010/0135625 A1 for Reduced-Diameter Ribbon Cables with High-Performance Optical Fiber, filed Nov. 10, 2009, (Overton); U.S. Patent Application Publication No. US2010/0092139 A1 for a Reduced-Diameter, Easy-Access Loose Tube Cable, filed Nov. 10, 2009, (Overton); U.S. Patent Application Publication No. US2010/0154479 A1 for a Method and Device for Manufacturing an Optical Preform, filed Dec. 19, 2009, (Milicevic et al.); U.S. Patent Application Publication No. US 2010/0166375 for a Perforated Water-Blocking Element, filed Dec. 29, 2009, (Parris); U.S. Patent Application Publication No. US2010/0183821 A1 for a UVLED Apparatus for Curing Glass-Fiber Coatings, filed Dec. 30, 2009, (Hartsuiker et al.); U.S. Patent Application Publication No. US2010/0202741 A1 for a Central-Tube Cable with High-Conductivity Conductors Encapsulated with High-Dielectric-Strength Insulation, filed Feb. 4, 2010, (Ryan et al.); U.S. Patent Application Publication No. US2010/0215328 A1 for a Cable Having Lubricated, Extractable Elements, filed Feb. 23, 2010, (Tatat et al.); U.S. Patent Application Publication No. US2011/0026889 A1 for a Tight-Buffered Optical Fiber Unit Having Improved Accessibility, filed Jul. 26, 2010, (Risch et al.); U.S. Patent Application Publication No. US2011/0064371 A1 for Methods and Devices for Cable Insertion into Latched Conduit, filed Sep. 14, 2010, (Leatherman et al.); U.S. Patent Publication No. 2011/0069932 A1 for a High-Fiber-Density Optical-Fiber Cable, filed Oct. 19, 2010, (Overton et al.); U.S. Patent Publication No. 2011/0091171 A1 for an Optical-Fiber Cable Having High Fiber Count and High Fiber Density, filed Oct. 19, 2010, (Tatat et al.); U.S. patent application Ser. No. 13/009,118 for a Water-Soluble Water-Blocking Element, filed Jan. 19, 2011, (Parris); and U.S. patent application Ser. No. 13/096,178 for a Data-Center Cable, filed Apr. 28, 2011, (Louie et al.).

In the specification and/or FIGURE, typical embodiments of the invention have been disclosed. The present invention is not limited to such exemplary embodiments. The use of the term "and/or" includes any and all combinations of one or more of the associated listed items. The FIGURE is a schematic representation and so is not necessarily drawn to scale. Unless otherwise noted, specific terms have been used in a generic and descriptive sense and not for purposes of limitation.

The invention claimed is:

1. A bundled fiber optic cable, comprising:
   a plurality of cable units stranded at unit-stranding radius $R_U$ and unit-stranding angle $\alpha_U$;
   a first binder yarn stranded around said cable units at first binder-stranding radius $R_{Y1}$ and first binder-stranding angle $\alpha_{Y1}$; and
   a second binder yarn stranded around said cable units at second binder-stranding radius $R_{Y2}$ and second binder-stranding angle $\alpha_{Y2}$;
   wherein said first binder-stranding radius $R_{Y1}$ is substantially equal to said second binder-stranding radius $R_{Y2}$;
   wherein said first binder-stranding angle $\alpha_{Y1}$ is substantially equal to said second binder-stranding angle $\alpha_{Y2}$; and
   wherein:

$$2.5 R_{Y1} \cdot \tan(\alpha_{Y1}) \leq R_U \cdot \tan(\alpha_U) \leq 26.5 R_{Y1} \cdot \tan(\alpha_{Y1}).$$

2. The bundled fiber optic cable according to claim 1, wherein:

$$5 R_{Y1} \cdot \tan(\alpha_{Y1}) \leq R_U \cdot \tan(\alpha_U) \leq 8 R_{Y1} \cdot \tan(\alpha_{Y1}).$$

3. The bundled fiber optic cable according to claim 1, wherein:

$$6.5 R_{Y1} \cdot \tan(\alpha_{Y1}) \approx R_U \cdot \tan(\alpha_U).$$

4. The bundled fiber optic cable according to claim 1, wherein said first binder yarn and said second binder yarn comprise finished yarns.

5. The bundled fiber optic cable according to claim 1, wherein said first binder yarn and said second binder yarn comprise semi-finished yarns.

6. A bundled fiber optic cable, comprising:
a plurality of cable units stranded at unit-stranding radius $R_U$ and unit-stranding angle $\alpha_U$;
a first binder yarn stranded around said cable units at first binder-stranding radius $R_{Y1}$ and first binder-stranding angle $\alpha_{Y1}$; and
a second binder yarn stranded around said cable units at second binder-stranding radius $R_{Y2}$ and second binder-stranding angle $\alpha_{Y2}$;
wherein said first binder yarn and said second binder yarn are contra-helically stranded;
wherein said first binder-stranding radius $R_{Y1}$ is substantially equal to said second binder-stranding radius $R_{Y2}$;
wherein said first binder-stranding angle $\alpha_{Y1}$ is substantially equal to said second binder-stranding angle $\alpha_{Y2}$; and
wherein:

$$2.5 R_{Y1} \cdot \tan(\alpha_{Y1}) \leq R_U \cdot \tan(\alpha_U) \leq 26.5 R_{Y1} \cdot \tan(\alpha_{Y1}).$$

7. The bundled fiber optic cable according to claim 6, wherein:

$$5 R_{Y1} \cdot \tan(\alpha_{Y1}) \leq R_U \cdot \tan(\alpha_U) \leq 8 R_{Y1} \cdot \tan(\alpha_{Y1}).$$

8. The bundled fiber optic cable according to claim 6, wherein:

$$6.5 R_{Y1} \cdot \tan(\alpha_{Y1}) \approx R_U \cdot \tan(\alpha_U).$$

9. The bundled fiber optic cable according to claim 6, wherein said first binder yarn and said second binder yarn comprise finished yarns.

10. The bundled fiber optic cable according to claim 6, wherein said first binder yarn and said second binder yarn comprise semi-finished yarns.

11. A bundled fiber optic cable, comprising:
a plurality of stranded cable units;
a first binder stranded at pitch $S_{Y1}$ around said cable units, said first binder comprising a leading helical subyarn and a trailing helical subyarn, wherein said leading helical subyarn exhibits a translational phase shift from said trailing helical subyarn of more than 0 degrees and less than about 90 degrees; and
a second binder stranded at pitch $S_{Y2}$ around said cable units, said second binder comprising a leading helical subyarn and a trailing helical subyarn, wherein said leading helical subyarn exhibits a translational phase shift from said trailing helical subyarn of more than 0 degrees and less than about 90 degrees;
wherein said first binder and said second binder are contra-helically stranded; and
wherein said first binder's pitch $S_{Y1}$ is substantially equal to said second binder's pitch $S_{Y2}$.

12. The bundled fiber optic cable according to claim 11, wherein said first binder's leading helical subyarn exhibits a translational phase shift from said first binder's trailing helical subyarn of more than about 5 degrees.

13. The bundled fiber optic cable according to claim 11, wherein said first binder's leading helical subyarn exhibits a translational phase shift from said first binder's trailing helical subyarn of less than about 60 degrees.

14. The bundled fiber optic cable according to claim 11, wherein said first binder's leading helical subyarn exhibits a translational phase shift from said first binder's trailing helical subyarn of less than about 45 degrees.

15. The bundled fiber optic cable according to claim 11, wherein said first binder's leading helical subyarn exhibits a translational phase shift from said first binder's trailing helical subyarn of between about 10 degrees and 30 degrees.

16. The bundled fiber optic cable according to claim 11, wherein said first binder's leading helical subyarn exhibits a translational phase shift from said first binder's trailing helical subyarn of less than 10 degrees.

17. The bundled fiber optic cable according to claim 11, wherein said second binder's leading helical subyarn exhibits a translational phase shift from said second binder's trailing helical subyarn of more than about 5 degrees.

18. The bundled fiber optic cable according to claim 11, wherein said second binder's leading helical subyarn exhibits a translational phase shift from said second binder's trailing helical subyarn of less than about 45 degrees.

19. The bundled fiber optic cable according to claim 11, wherein said second binder's leading helical subyarn exhibits a translational phase shift from said second binder's trailing helical subyarn of between about 10 degrees and about 30 degrees.

20. The bundled fiber optic cable according to claim 11, wherein said second binder's leading helical subyarn exhibits a translational phase shift from said second binder's trailing helical subyarn of less than 10 degrees.

21. A method of making the bundled fiber optic cable according to claim 11, comprising the steps of:
stranding two or more cable units to achieve the plurality of stranded cable units; and
contra-helically stranding the first binder at pitch $S_{Y1}$ and the second binder at pitch $S_{Y2}$ around the plurality of stranded cable units while:
(i) maintaining a translation phase shift of more than 0 degrees and less than about 90 degrees between the first binder's leading helical subyarn and the first binder's trailing helical subyarn; and
(ii) maintaining a translation phase shift of more than 0 degrees and less than about 90 degrees between the second binder's leading helical subyarn and the second binder's trailing helical subyarn.

* * * * *